March 25, 1958 H. STRASSER 2,827,681
MACHINES FOR TRIMMING CERAMIC APPENDAGES
Filed Sept. 16, 1953 4 Sheets-Sheet 1

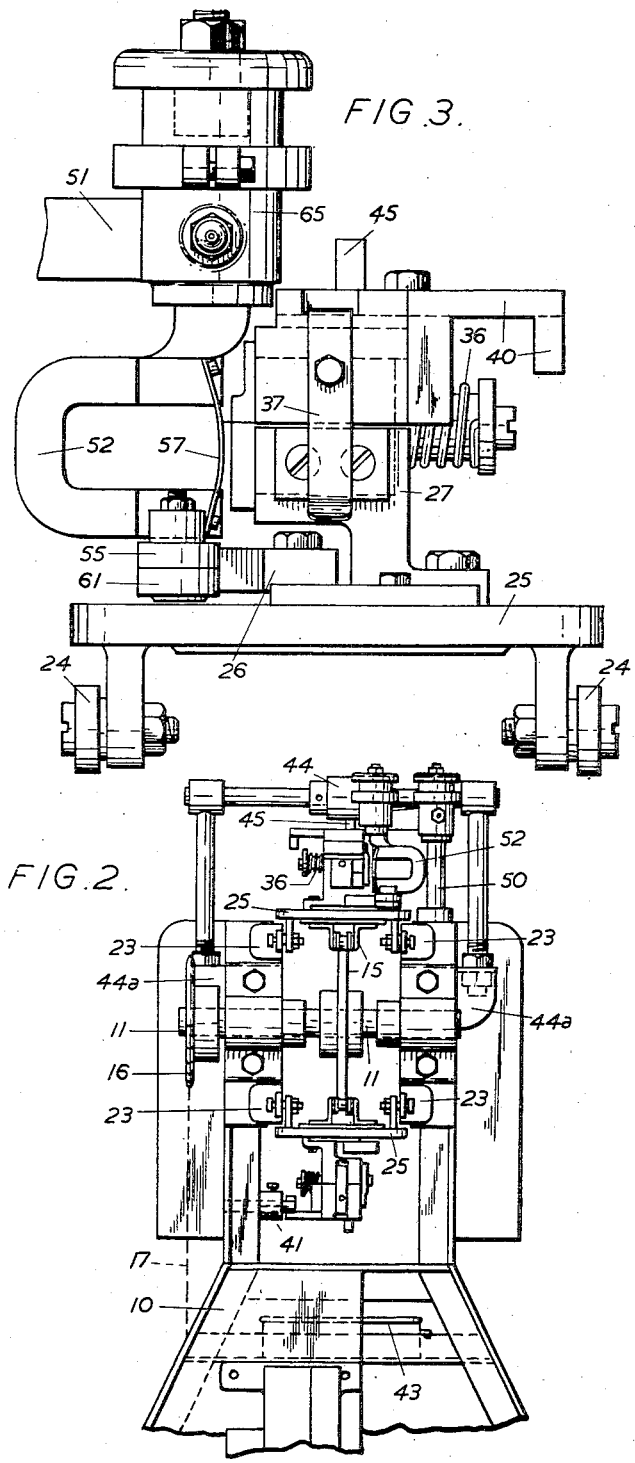

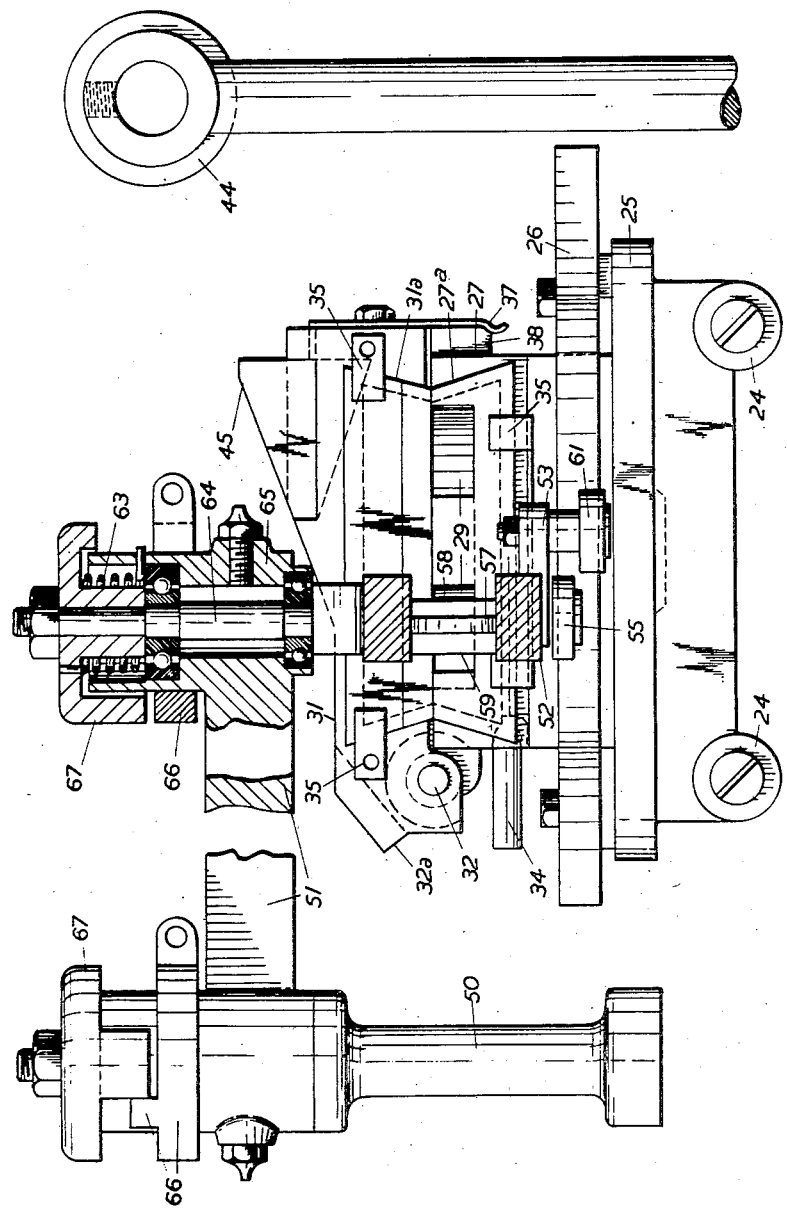

March 25, 1958 H. STRASSER 2,827,681
MACHINES FOR TRIMMING CERAMIC APPENDAGES
Filed Sept. 16, 1953 4 Sheets-Sheet 4

2,827,681

MACHINES FOR TRIMMING CERAMIC APPENDAGES

Hans Strasser, Stoke-on-Trent, England

Application September 16, 1953, Serial No. 380,577

9 Claims. (Cl. 25—104)

This invention relates to machines for trimming ceramic appendages, such as handles for cups and similar articles of hollow-ware. They will be hereinafter referred to as cup-handles for the sake of convenience.

Machines for trimming these handles are known, in which a cutting blade is guided to move in a path which corresponds to the contour of the side wall of the cup, the blade being moved along the appendage by means of a handle.

The object of this invention is to provide an automatic machine for the purpose which will not only be capable of a higher output per operator but will be able to deal with handles of several different shapes or patterns at the same time, and will also be able to deliver the different handles separately.

This invention consists in an endless conveyor carrying a number of handle supporting units each comprising a cradle for holding a handle and guide means corresponding to the contour of the cup, the handle-supporting units being carried by the conveyor successively through a cutting station where a trimming device controlled by the guide means acts upon each handle to produce on it the contour of the cup to which it is later to be attached.

Figure 1:
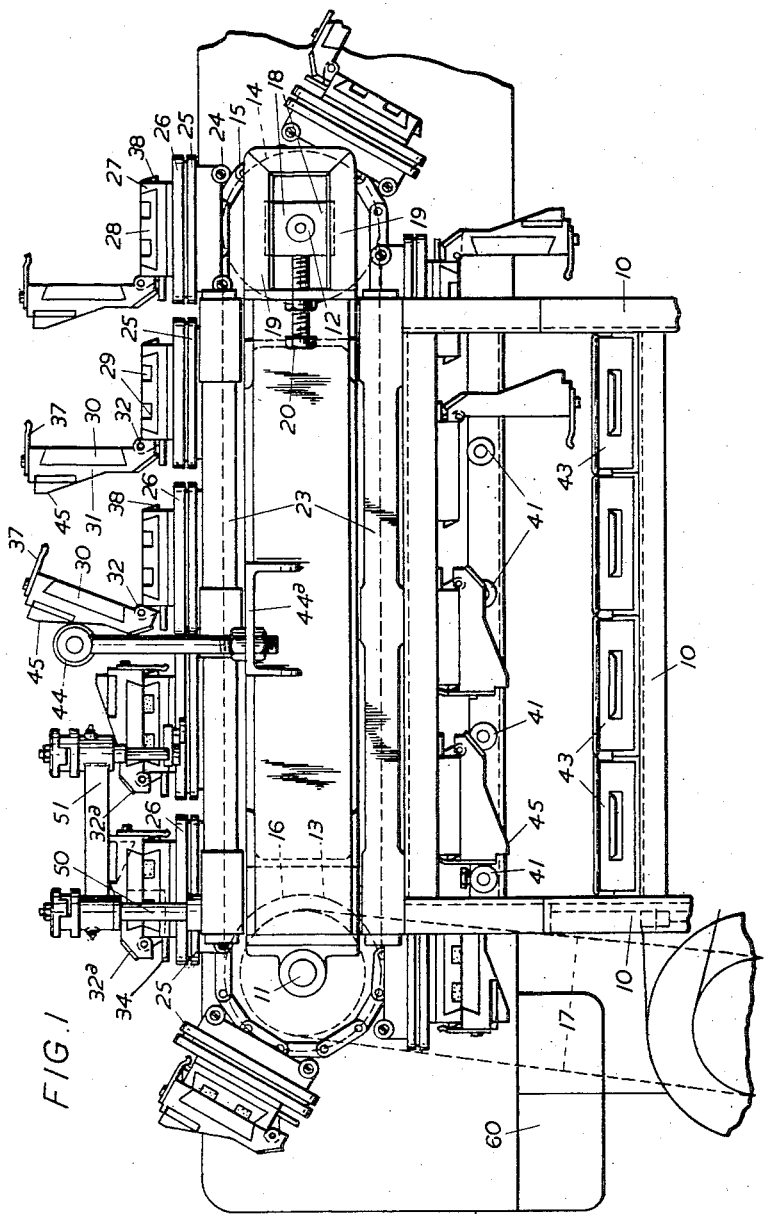
Figure 5:
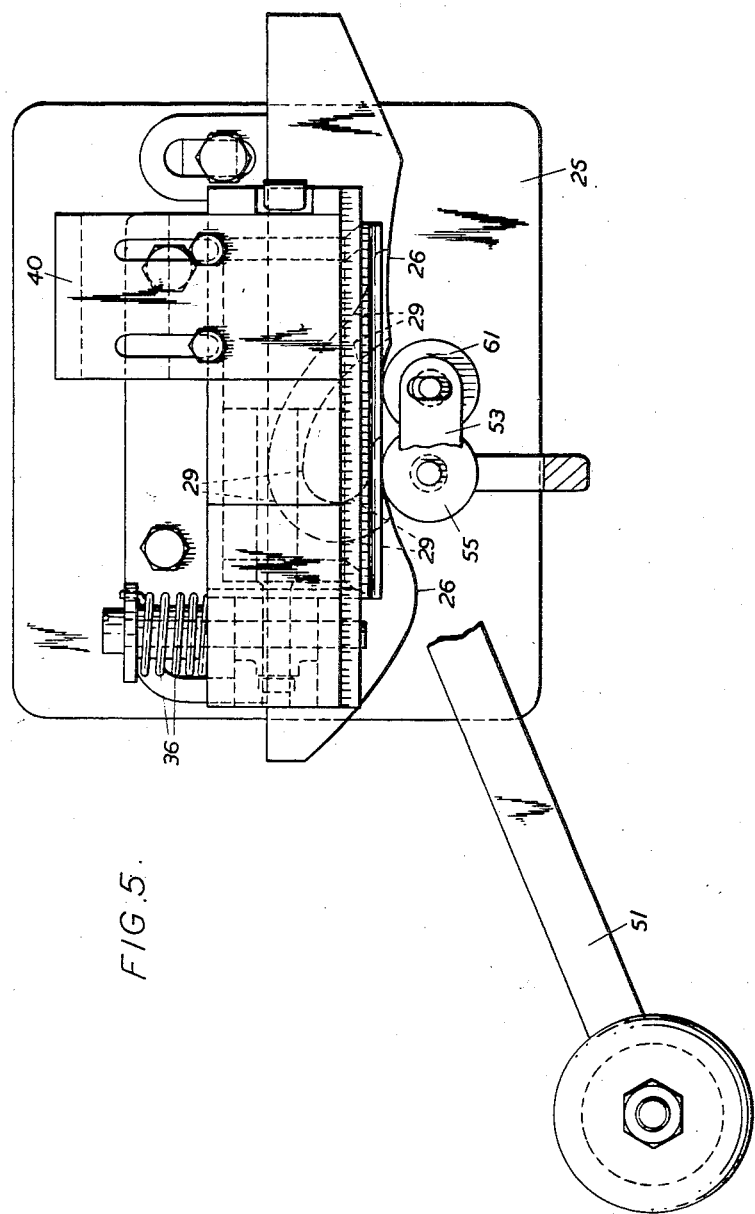

A constructional form of the invention will now be described with reference to the accompanying drawings, in which:

Figure 1 is a front elevation.
Figure 2 is an end view.
Figure 3 is an end view of the cradle and associated parts in the cutting station, and Figures 4 and 5 are a front view and plan thereof respectively.

The machine comprises a frame 10 in which shafts 11, 12 are mounted carrying chain sprockets 13, 14 which have an endless chain conveyor 15 passing round them. The shaft 11 is the driving shaft and may be driven in any convenient way through any suitable gearing from any convenient form of motor or the like. In Figure 2 it is shown as driven by a further sprocket 16 and chain 17 but this is not essential. The lower part of the frame 10 has been broken away for convenience in illustration. The shaft 12 is carried in bearings 18 which are adjustable in guides 19 by means of an adjusting screw 20 for the purpose of tensioning the chain conveyor 15. Mounted on the chain at suitable intervals are a number of handle supporting units, each consisting of a base or platform 25, carrying guide rollers 24 which run in guide rails 23 in the frame, further guide means in the form of a profile or template 26, and a cradle comprising a fixed base 27 with a rubber or similar flexible holder 28 recessed at 29 to receive the handle to be trimmed, co-operating with a similar rubber or other flexible holder 30 carried by a movable part 31 of the cradle hinged at 32 to the fixed part. The hinged part 31 of the cradle has a projection 32ª which bears on one end of a lever 34 which is mounted for rocking movement in the base 27 of the cradle and arranged to press on the underside of the rubber part 28 when the cradle is opened and the projection 32ª presses on the lever 34. The cradle includes clips 35 for holding the rubber members 28, 30 in position, the parts 27, 31 being undercut to receive the correspondingly shaped rubber members as indicated at 27ª, 31ª, Figure 4. Each cradle tends to open automatically about its hinge 32 under the action of a spring 36, but when closed is held in position to grip the handle by means of a spring clip 37 engaging with a lug 38. There may be any number of these handle supporting units on the conveyor 15, and they need not all be shaped to receive identical handles. Each cradle carries an abutment 40 for engagement with a striker for opening out the cradle to eject the handle, and the abutments can be differently set or adjusted for actuation by one only of several strikers. As shown there are twelve units on the conveyor, and there are four separate strikers 41, each striker operating three out of the twelve cradles by means of the abutments 40, so that different handles are released at different points along the travel of the conveyor. As each cradle is opened the lever 34 is actuated by the projection 32ª to press on the rubber member 28 and cause it to bulge so that the recess 29 containing the handle is opened out sufficiently to release the handle, which thereupon drops into the appropriate one of four receptacles 43 carried by the frame 10. Thus each receptacle 43 receives one pattern of handle and the handles do not have to be sorted out afterwards. The cradles may be differently colored or marked for easy identification corresponding to differently coloured or marked trays containing handles to be fed to the machine. After the cradles have been opened out and the handles ejected, a fresh handle is inserted in the recess 29 and the cradles each move on until another striker 44 adjustably mounted on brackets 44ª on the frame 10 acts on an adjustable surface or ramp 45 on each cradle to close it up. The closed cradle now carries the handle through a cutting station. The cutting unit consists of a vertical pillar 50 supported on the frame 10, having an arm 51 pivotally mounted on it, the other end of the arm carrying a cutter holder 52. The cutter holder 52 has an extension or cranked member 53 and is pivotally movable about the end of the arm 51. A roller 55 attached to the cutter holder 52 rides along the profile 26 and swings the holder so that it moves in a path which corresponds generally to the contour of the side wall of the cup with which the handle has to conform. The cutter holder carries a cutting device which is shown as a blade 57 curved to suit the horizontal radius or curvature of the cup, which blade is supplemented by two wires 58, 59, one mounted in advance of the blade to give the handle a preliminary trimming and the other mounted to follow it and deflect the cut scraps of clay so that they do not adhere to the handle but fall instead into a scrap receiver 60. However any other form of cutting device may be used, for example a rotary cylinder cutter having several blades, which could be rotated by means of a spiral belt drive from a suitable motor, and which might be eccentrically mounted so that its engagement with the handle would be progressive. It is desirable to ensure that the cutting device is maintained always at a proper cutting angle to the oncoming handle and for this purpose an adjustable pilot roller 61 carried by the extension 53 acts to swivel the cutting blade as the pilot roller rides along the profile. This swivelling movement of the cutter holder is opposed by a spring 63 fitted round a spindle 64 in a housing 65 which forms the axis about which the swivelling movement takes place. The amount of swivelling movement is restricted by a stop device 66 and the spring 63 is adjusted by a collar 67 to which the spring is anchored. A similar spring-loading around the pillar 50 acts on the arm 51 to hold the cutter holder against the profile and is also controlled by a stop device 66 and collar 67. The profile may not correspond exactly to the whole of the contour in order to ensure that the blade is maintained in a proper cutting relationship with the handle it is acting upon; it may only correspond to the contour where the ends of the handle are to be applied to the cup, that is to say where the openings of the recess 29 are situated as seen in Figure 5. Beyond each of these critical points of the contour the profile may continue for a little distance to follow the same line; that is to say the curvature at the cutting portions is correspondingly prolonged along the profile 26, so that the pilot roller 61 riding along these prolongations maintains the blade 57 at the appropriate angle as it follows along after the pilot roller. However this arrangement may have to be altered to suit some shapes of cup, and it may be that in some cases the profile will have to be provided with one path for the main roller 55 and another different path for the pilot roller 61 so as to ensure the desired action of the blade 57. The profiles on the various handle supporting units all have a standard pattern of leading-edge and trailing edge so that the engagement of the rollers with the profiles is achieved smoothly irrespective of variations in the shape of the profiles themselves. It will be seen that each handle-supporting unit as it enters the cutting station, carrying its profile with it, automatically actuates the cutter device to produce the required cutting action on the handle. The cut handle is then carried round the end of the conveyor travel and begins the return run, where it is ejected by the lever 34 when the cradle is opened by the appropriate striker 41. The lever 34 continues to hold the recess 29 open until another handle has been inserted and the cradle is closed again, by the striker 44.

In the existing machines only one pattern of handle can be dealt with at a time so that where a number of different shapes are being manufactured simultaneously it is necessary to have a separate machine for each shape. By my machine the different patterns can be trimmed at one and the same time on a single machine by a single operator and the various outputs regulated according to need. For example if the conveyor carries twelve units, instead of there being three each of four different pattern cradles, there could be two each of six different patterns, or for example six of one pattern, four of a second, and two of a third. The machine is easily adapted to the day-to-day needs of a factory. It will be understood that the cradles and profiles can be readily detached from their bases or platforms and interchanged when required, and the position of the opening strikers 41 can be adjusted to suit.

I claim:

1. A machine for trimming cup handles comprising a frame, a loading station, a cutting station and at least two discharge stations all carried by the frame, a plurality of two-part differently shaped handle-supporting units, means for carrying said handle-supporting units non-stop successively through the loading, cutting and discharge stations and back to the loading station, guide means attached to each handle-supporting unit, cutting means at said cutting station, said cutting means including a blade holder and a shaped cutting blade, said guide means serving to guide said cutting means in a constantly uniform cutting relation along individual cutting paths each corresponding generally with the contours of the respective individual cups, and means attached to the frame for engaging successively with the two-part handle-supporting units to close them before they reach the cutting station and to open them selectively as each reaches its predetermined discharge station.

2. A machine according to claim 1 in which the two two parts of each of said handle-supporting units have a hinged connection between them, each hinged part containing a resilient member, one of said resilient members having a recess shaped to receive a handle, and means on each handle-supporting unit acting to close and open the two parts about the hinged connection before and after cutting respectively, said means acting also to vary the position of opening according to the individual handle shapes.

3. A machine according to claim 2 in which each of the said handle-supporting units has an abutment engageable by separate opening and closing strikers, a number of opening strikers being so designed that each differently shaped and differently cut handle fed successively into the machine is continually sorted out at different discharge stations into accumulations of handles of identical shape and identical cut.

4. A machine as claimed in claim 2 in which the recessed rubber member is acted upon by an ejection lever operated by the opening of the cradle after being passed through the cutting station to open out the recess sufficiently to allow the handle to fall out.

5. A machine according to claim 1 in which the guide means on the handle supporting units each comprise a profile of the requisite contour and a roller forming part of the trimming device which rides along the profile as the handle supporting unit passes through the cutting station.

6. A machine according to claim 5 having two rollers riding along the profile, serving to guide the cutting device in the desired path and also to swivel the cutting device to maintain it at a proper cutting angle with the handle during its travel.

7. A machine according to claim 6 in which both rollers ride along the same path along the profile.

8. A machine according to claim 7 in which the profile includes two paths, one for each roller.

9. A machine according to claim 5 in which a cutting blade carried in a holder has associated with it rollers which ride along the handle-supporting units, spring means being provided acting to maintain said rollers in engagement with said profiles on the handle-supporting units, the movement under the spring action being limited by a stop.

References Cited in the file of this patent
UNITED STATES PATENTS

| | | |
|---|---|---|
| 2,309,726 | Zalewski | Feb. 2, 1943 |
| 2,361,312 | Miller | Oct. 24, 1944 |
| 2,413,540 | Bloore | Dec. 31, 1946 |
| 2,537,922 | Strasser | Jan. 9, 1951 |
| 2,558,318 | Sebell | June 26, 1951 |